(12) United States Patent
Yoon et al.

(10) Patent No.: US 9,536,126 B2
(45) Date of Patent: Jan. 3, 2017

(54) FUNCTION EXECUTION METHOD BASED ON A USER INPUT, AND ELECTRONIC DEVICE THEREOF

(71) Applicant: Samsung Electronics Co., Ltd., Gyeonggi-do (KR)

(72) Inventors: Sung-Jin Yoon, Gyeonggi-do (KR); Yu-Jin Lee, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 27 days.

(21) Appl. No.: 14/468,962

(22) Filed: Aug. 26, 2014

(65) Prior Publication Data

US 2015/0063662 A1    Mar. 5, 2015

(30) Foreign Application Priority Data

Aug. 28, 2013  (KR) .................. 10-2013-0102212
Jul. 1, 2014    (KR) .................. 10-2014-0081753

(51) Int. Cl.
  *G06K 9/00*       (2006.01)
  *G06F 3/0488*     (2013.01)
  *G06F 3/0486*     (2013.01)

(52) U.S. Cl.
  CPC ......... *G06K 9/00013* (2013.01); *G06F 3/0486* (2013.01); *G06F 3/04883* (2013.01); *G06F 3/04886* (2013.01)

(58) Field of Classification Search
  CPC ............ G06K 9/00013; G06F 3/04883; G06F 3/0486; G06F 3/04886
  See application file for complete search history.

(56) References Cited

U.S. PATENT DOCUMENTS

| | | | | |
|---|---|---|---|---|
| 5,420,936 A | * | 5/1995 | Fitzpatrick | G06F 21/32 340/5.53 |
| 7,420,546 B2 | * | 9/2008 | Abdallah | G06F 21/32 345/156 |
| 8,638,305 B2 | * | 1/2014 | Inami | G06F 3/04883 340/5.83 |
| 8,745,490 B2 | * | 6/2014 | Kim | G06F 3/042 345/173 |
| 9,076,008 B1 | * | 7/2015 | Moy | G06F 21/60 |
| 2009/0083847 A1 | | 3/2009 | Fadell et al. | |
| 2014/0013254 A1 | * | 1/2014 | Hosein | G06F 3/04817 715/765 |
| 2014/0181962 A1 | * | 6/2014 | Seo | G06F 21/32 726/19 |
| 2014/0283142 A1 | * | 9/2014 | Shepherd | G06F 3/0482 726/30 |
| 2014/0359757 A1 | * | 12/2014 | Sezan | G06F 21/32 726/19 |

* cited by examiner

*Primary Examiner* — Daniel Mariam
(74) *Attorney, Agent, or Firm* — Cha & Reiter, LLC

(57) ABSTRACT

Provided is a method and apparatus for executing a function based on a user input. The method of executing a function in an electronic device includes: sensing a user input for selecting an object in a first area; recognizing a surface pattern of an input unit used for providing a user input in a third area when the user input is sensed in the third area; and executing a related function, based on a surface pattern recognition result in the third area when the user input of the first area and the user input of the third area are associated with each other. Accordingly, a function desired by a user may be readily executed.

18 Claims, 10 Drawing Sheets

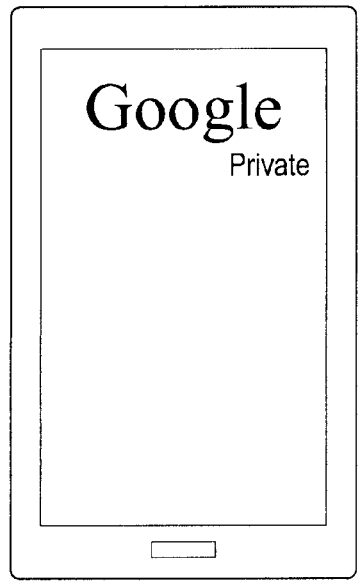 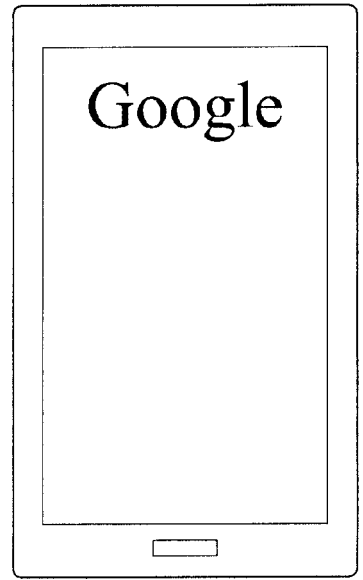
FIG.5E    FIG.5F
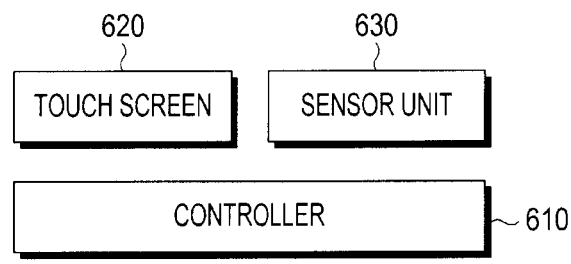
FIG.6

FUNCTION EXECUTION METHOD BASED ON A USER INPUT, AND ELECTRONIC DEVICE THEREOF

CLAIM OF PRIOROTY

This application claims the priority under 35 U.S.C. §119(a) to Korean Application Serial No. 10-2013-0102212, which was filed in the Korean Intellectual Property Office on Aug. 28, 2013, and a Korean Patent Application Serial No. 10-2014-0081753, which was filed in the Korean Intellectual Property Office on Jul. 1, 2014, the entire content of which is hereby incorporated by reference.

TECHNICAL FIELD

The present disclosure relates generally to a method and apparatus for executing a function based on a user input in an electronic device.

BACKGROUND

A variety of methods for user authentication have been applied to various electronic devices such as a smart phone and the like. One of the methods for the user authentication is a user authentication method through fingerprint recognition. For example, a sensor for recognizing a fingerprint may be contained in one side of an electronic device. The electronic device recognizes a fingerprint input by a user, and determines whether the corresponding user is a proper user.

SUMMARY

According to the above described conventional art, a user is required to provide an input to execute a desired function after executing a procedure for user authentication. For example, the user is required to execute an operation for user authentication based on guidance provided from an electronic device. Upon completion of the user authentication, the user needs to provide an input for the desired function. That is, according to the conventional art, multiple stages of the user authentication and providing an input for a function are required.

Accordingly, an aspect of the present disclosure is to provide a method and an apparatus for enabling a user to readily execute a desired function.

Another aspect of the present disclosure is to provide a method and an apparatus for enabling a user to readily execute user authentication and a desired function through a single procedure.

In accordance with another aspect of the present disclosure, a method of executing a function in an electronic device is provided. The method includes: sensing a user input for selecting an object in a first area; recognizing a surface pattern of an input unit used for providing a user input in a third area when the user input is sensed in the third area; and executing a related function, based on a surface pattern recognition result in the third area when the user input of the first area and the user input of the third area are associated with each other.

In accordance with another aspect of the present disclosure, a method of executing a function in an electronic device is provided. The method includes: recognizing a surface pattern of an input unit used for providing a user input in a first area when the user input is sensed in the first area; and executing a related function associated with the user input of the first area and a user input of a second area, based on a surface pattern recognition result in the first area when the user input for selecting an object is sensed in the second area.

In accordance with another aspect of the present disclosure, a function execution apparatus in an electronic device is provided. The function execution apparatus includes: a touch screen; a sensor unit that recognizes a surface pattern of an input unit; and a controller that senses a user input for selecting an object in a first area, recognizes a surface pattern of an input unit used for providing a user input in a third area when the user input is sensed in the third area, and executes a related function based on a surface pattern recognition operation in the third area when the user input of the first area and the user input of the third area are associated with each other.

In accordance with another aspect of the present disclosure, a function execution apparatus in an electronic device is provided. The function execution apparatus includes: a touch screen; a sensor unit that recognizes a surface pattern of an input unit; and a controller that recognizes a surface pattern of an input unit used for providing a user input in a first area when the user input is sensed in the first area, and executes a related function associated with the user input of the first area and a user input of a second area, based on a surface pattern recognition motion in the first area when the user input for selecting an object is sensed in the second area.

Effect of the Disclosure

According to embodiments of the present disclosure, a user readily executes a desired function. Also, the user may readily execute user authentication and a desired function through a single procedure.

BRIEF DESCRIPTION OF THE DRAWINGS

The above and other aspects, features, and advantages of the present disclosure will be more apparent from the following detailed description taken in conjunction with the accompanying drawings, in which:

FIG. 5A, FIG. 5B, FIG. 5C, FIG. 5D, FIG. 5E and FIG. 5F illustrate examples of a function execution method performed in an electronic device according to an embodiment of the present disclosure; and FIG. 6 is a block diagram illustrating a function execution apparatus in an electronic device according to various embodiments of the present disclosure.

DETAILED DESCRIPTION

In the following description of the present disclosure, a detailed description of related well-known functions or structures incorporated herein will be omitted when it may make the subject matter of the present disclosure rather unclear.

Hereinafter, various embodiments of the present disclosure will be described with reference to the accompanying drawings.

Figure 1A:
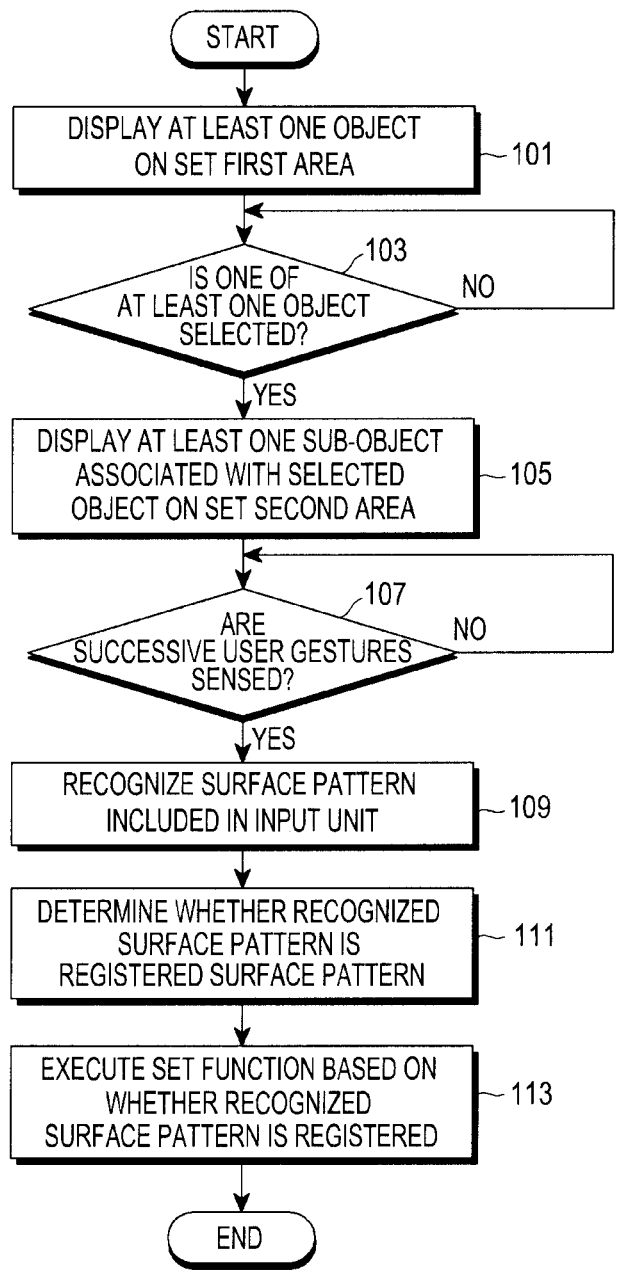
FIG. 1A is a flowchart illustrating a function execution method according to an embodiment of the present disclosure.

FIG. 1A is a flowchart of a function execution method according to an embodiment of the present disclosure.

In operation 101, an electronic device displays at least one object in a set first area. The set first area may correspond to an entirety or a portion of a display area. The at least one object may be an icon to which a predetermined function is assigned. For example, the at least one object may be an icon for executing a predetermined application.

In operation 103, the electronic device determines whether a user input for selecting one of the at least one object displayed on the first area exists. The user input for selecting one of the at least one object may include, for example, a gesture motion, a touch motion, and the like, and the user input may be executed by a finger of a user or a separate input unit, for example, an electronic pen or the like.

In operation 105, the electronic device displays at least one sub-object associated with the selected object on a set second area, and proceeds with operation 107. The set second area may correspond to a portion of the display area. For example, the second area may be an area included in the first area, or may be an area different from the first area.

In operation 107, the electronic device determines whether a user input is sensed in a set third area. The third area may be an area that is different from the first area and the second area. The third area may be an area included in the first area or the second area, or an area included in both the first and the second area. The third area may be an area on a touch screen or an area that is different from the touch screen. For example, the third area may be an area that is located on a frame adjacent to the touch screen.

The electronic device determines whether user inputs sensed in the first area, the second area, and the third area are inputs that are associated with each other. For example, the electronic device determines whether the user inputs sensed in the first area, the second area, and the third area correspond to a continuous input motion.

The continuous input motion may be, for example, a user input, such as, a swipe motion, that starts from one of the at least one object displayed on the first area, passes through one of the at least one sub-objects displayed on the second area, and ends on the third area. For example, the electronic device may determine whether the user inputs sensed in the first area, the second area, and the third area correspond to a sequential input motion. The sequential input motion may be a user input that is sequentially sensed in each of the first area, the second area, and the third area, within a predetermined period of time.

In operation 109, the electronic device recognizes a surface pattern of an input unit used for the user input. The input unit may be, for example, a finger of a user or various devices such as an electronic pen and the like. When the input unit is the finger of the user, the surface pattern may be, for example, a fingerprint. When the input unit is a device such as an electronic pen and the like, the surface pattern may be a pattern carved on a surface that is in contact with the touch screen. A recognition unit that may recognize the surface pattern may be located in the third area, and the recognition unit may be, for example, a fingerprint sensor.

In operation 111, the electronic device determines whether the recognized surface pattern is identical to a registered surface pattern.

In operation 113, the electronic device executes a set function based on whether the recognized surface pattern is registered. The set function may be, for example, a function associated with an object selected by a user input in the first area and/or a function associated with a sub-object through which a user input passes in the second area. According to an embodiment of the present disclosure, the electronic device may compare the recognized surface pattern with at least one registered surface pattern. The electronic device may determine a function to be executed, based on whether a registered surface pattern identical to the recognized surface pattern exists.

For example, when a sub-object through which the user input passes is a sub-object that is associated with deletion of a predetermined application, and a registered surface pattern identical to the recognized surface pattern exists, the electronic device determines deletion of the corresponding application. For example, when a sub-object through which the user input passes is a sub-object that is associated with deletion of a predetermined application and a registered surface pattern identical to the recognized surface pattern does not exist, the electronic device determines deletion of a short-cut icon of the corresponding application.

According to an embodiment of the present disclosure, in operation 105, the electronic device determines the second area that is an area for displaying at least one sub-object. The electronic device may determine a location of the second area based on, for example, a location of the selected object and a location of the third area.

Figure 1B:
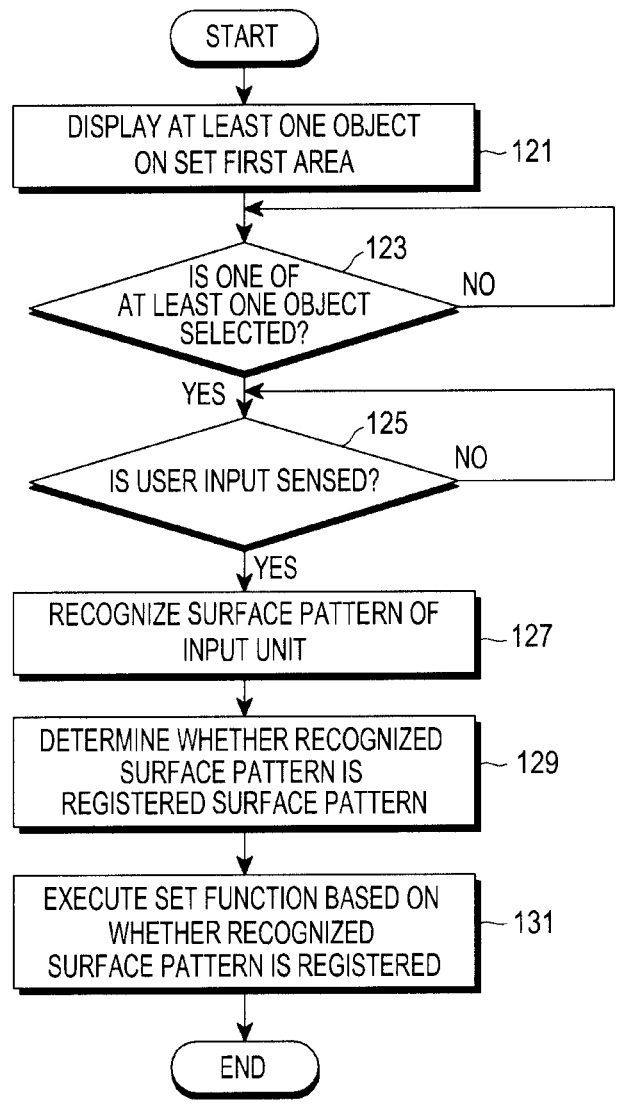
FIG. 1B is a flowchart illustrating another function execution method according to an embodiment of the present disclosure.

FIG. 1B is a flowchart illustrating another function execution method according to an embodiment of the present disclosure.

In operation 121, the electronic device displays at least one object on a set first area. The set first area may be a part or the entirety of a display area. The at least one object may be an icon to which a predetermined function is allocated. For example, the at least one object may be an icon for executing a predetermined application.

In operation 123, the electronic device determines whether a user input for selecting one of the at least one object displayed on the first area exists. The user input for selecting one of the at least one object may include, for example, a gesture motion, a touch motion, or the like. The user input may be executed by a finger of a user or a separate input unit, for example, an electronic pen or the like.

When it is determined that the user input for selecting one of the at least one object exists in operation 123, the electronic device determines whether a user input is sensed in a set third area in operation 125. The third area may be an area different from the first area, or may be an area included in the first area. The third area may be an area on a touch screen or an area different from the touch screen. For example, the third area may be an area located on a frame adjacent to the touch screen.

The electronic device may determine whether user inputs sensed in the first area and the third area are inputs that area associated with each other. For example, the electronic device may determine whether the user inputs sensed in the first area and the third area correspond to a continuous input motion. The continuous input motion may be, for example, a user input that starts from an object displayed on the first area and ends on the third area, for example, a swipe motion. For example, the electronic device may determine whether the user inputs sensed in the first area and the third area correspond to a sequential input motion. The sequential input motion corresponds to a user input that is sequentially sensed in each of the first area and the third area, within a predetermined period of time.

In operation 127, the electronic device recognizes a surface pattern of an input unit used for providing the user input. The input unit may correspond to various instruments, for example, a finger of a user, an electronic pen, and the like. When the input unit is a finger of a user, the surface pattern may be, for example, a fingerprint. When the input unit corresponds to various instruments, such as an electronic pen or the like, the surface pattern may be a pattern carved on a surface that is in contact with the touch screen. The third area may be a recognition unit that may recognize the surface pattern, and the recognition unit may be, for example, a fingerprint sensor.

In operation 129, the electronic device may determine whether the recognized surface pattern is a registered surface pattern.

In operation 131, the electronic device executes a set function based on whether the recognized surface pattern is registered. The set function may be, for example, a function associated with an object selected by a user input in the first area. According to an embodiment, the electronic device may compare the recognized surface pattern with at least one registered surface pattern. The electronic device may determine a function to be executed, based on whether a registered surface pattern identical to the recognized surface pattern exists.

For example, in the case in which the object selected by the user input in the first area is a predetermined application and the set function is execution of an application, when a registered surface pattern identical to the recognized surface pattern exists, the electronic device may automatically execute the predetermined application.

The function execution method performed in the electronic device has been described according to an embodiment of the present disclosure with reference to FIGS. 1A and 1B. Hereinafter, embodiments of the present disclosure will be described in detail with reference to related drawings.

FIGS. 2A through 2E illustrates a function execution method performed in an electronic device according to an embodiment of the present disclosure. In FIGS. 2A through 2E, an authentication and registration method performed in an electronic device to which a plurality of users may access has been described.

Figure 2A:
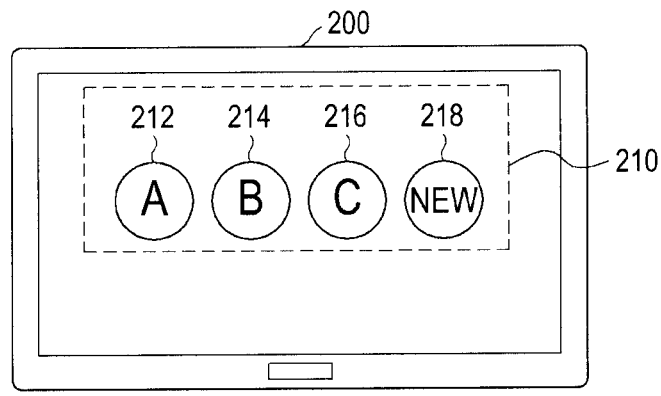
FIG. 2A, FIG. 2B, FIG. 2C, FIG. 2D, FIG. 2E, and FIG. 3A, FIG. 3B, FIG. 3C, FIG. 3D, FIG. 3E and FIG. 3F illustrate examples of a function execution method performed in an electronic device according to an embodiment of the present disclosure.
Figure 2B:
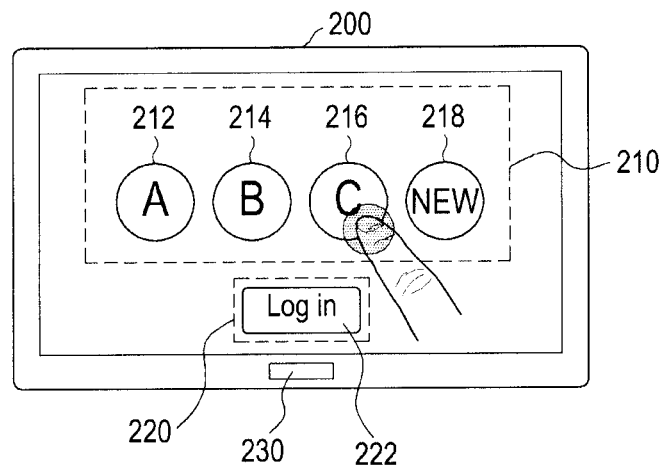

First, as illustrated in FIG. 2A, the electronic device displays at least one object 212, 214, 216, and 218 on a first area 210. Here, it is assumed that the objects 212, 214, and 216 are objects for displaying registered users (A,B, and C) in the electronic device to use the electronic device, and the object 218 is an object for registering a new user to use the electronic device. When one object 216 is selected, the electronic device (200) may display a sub-object 222 associated with the corresponding object 216 on a second area 220, as illustrated in FIG. 2B.

Figure 2C:
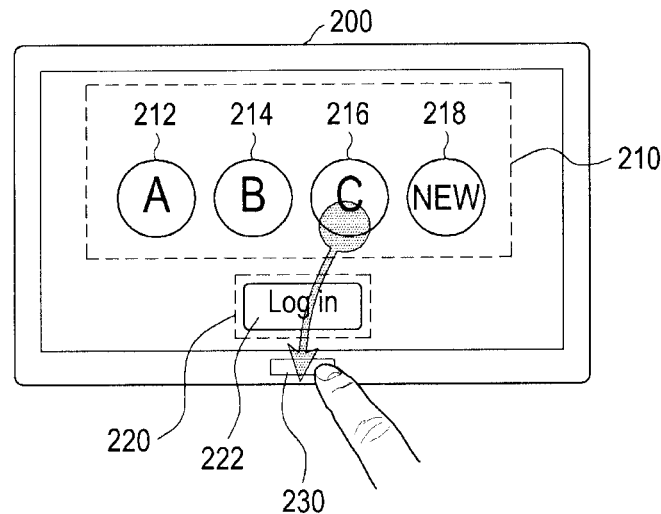

The electronic device (200) may execute recognition of a fingerprint when a user input that passes through the object 216 and the sub-object 222 is sensed in a third area 230, as illustrated in FIG. 2C. The user input may be successive user gestures, for example, a swipe motion. Whether the user input is continuously provided to the third area 230 may be determined based on whether a user input is sensed in the third area 230 within a predetermined period of time after a user input is recognized in the second area 220. For example, the electronic device (200) determines that a continuous user input is provided when a user input is sensed in the second area 220 and a user input is sensed in the third area 230 within 0.1 seconds. In the third area 230, a fingerprint sensor may be located. The set time may have various values other than 0.1 seconds, and may be set to a value designated by the user. When it is determined that the user input corresponds to a continuous user input, the electronic device (200) may compare a fingerprint recognized by the fingerprint sensor with a fingerprint of a registered user. For example, when the recognized fingerprint is identical to the fingerprint of the registered user (C), the electronic device (200) may perform a login function, and may display a set screen.

Figure 2D:
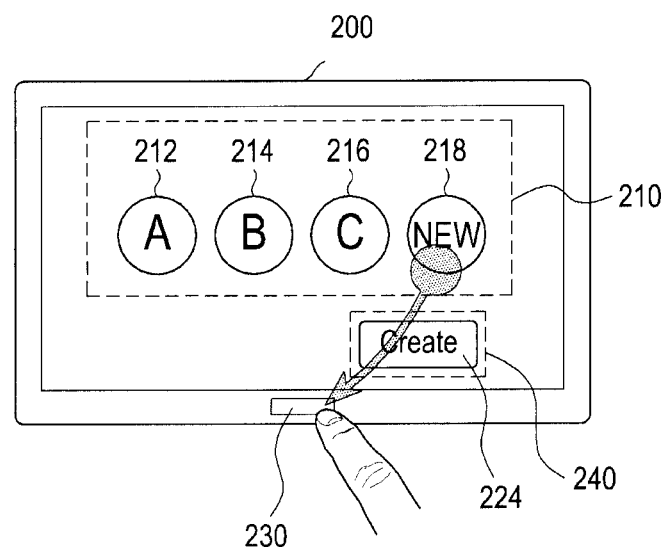

The electronic device (200) may determine the second area 220 based on a location of an object selected by the user and a location of the third area 230. For example, as illustrated in FIG. 2B, when the object 216 is selected, the electronic device (200) may determine an area between the object 216 and the third area 230 as the second area 220. For example, the electronic device (200) may enable the second area 240 to be located on the shortest line that connects the object 216 and the third area 230. For example, as illustrated in FIG. 2D, when the object 218 is selected, the electronic device (200) may determine an area located between the object 218 and the third area 230 as the second area 240. Referring to FIG. 2D, the second area 240 is located closer to the right side, when compared to the case illustrated in FIG. 2C. In an embodiment of the present disclosure, as illustrated in FIG. 2D, when the object 218 for registration of a user and a sub-object 224 are selected and fingerprint recognition is executed in the third area 230, the electronic device (200) may immediately register a fingerprint recognized in the third area 230 as a fingerprint of a new user.

Alternatively, when it is determined that the user input corresponds to a continuous user input occurred over the object 218 of the first area 210, the sub-object 224 of the second area 240 and the third area, the electronic device may immediately register a recognized fingerprint as a fingerprint of a new user in the third area 230 and display newly regostered user in the object 218.

Figure 2E:
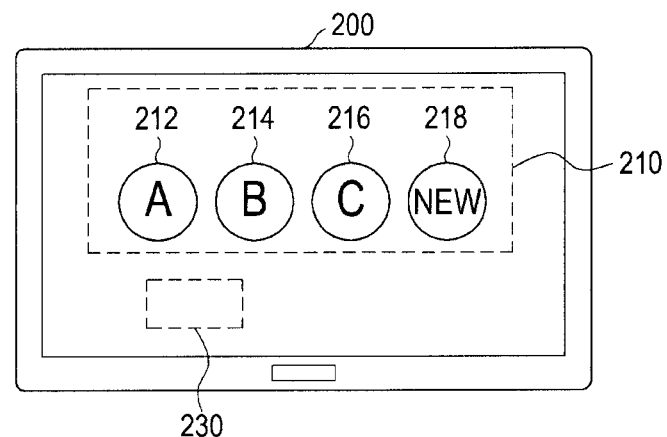

The third area 230 may be located in an area that is different from the touch screen as illustrated in FIGS. 2A through 2D, and may be located in an area on the touch screen as shown in FIG. 2E. The third area 230 located in the area of the touch screen as illustrated in FIG. 2E may also perform a function identical to the third area 230 located in the area different from the touch screen as illustrated in FIGS. 2A through 2D.

Figure 3A:
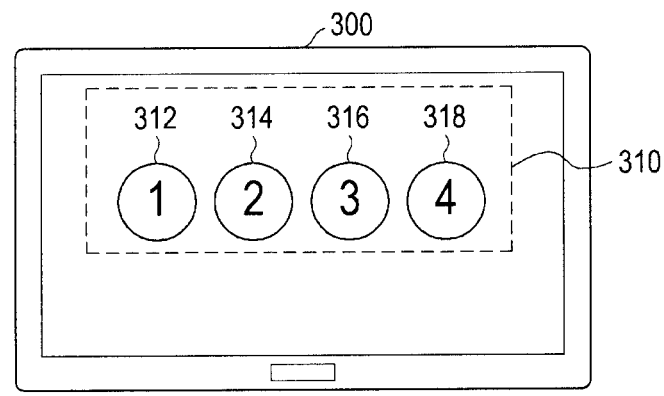
Figure 3B:
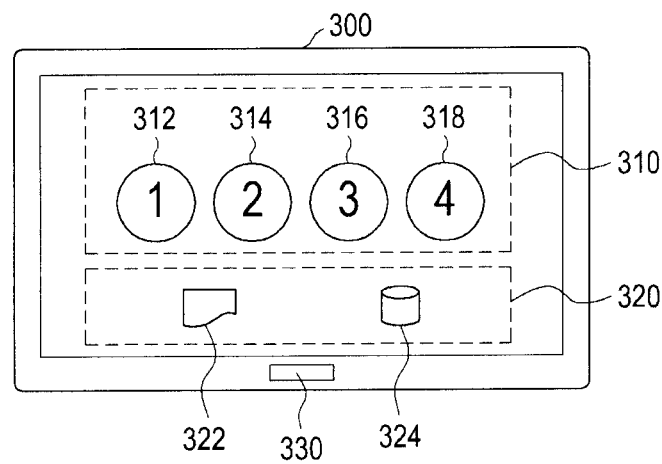
Figure 3C:
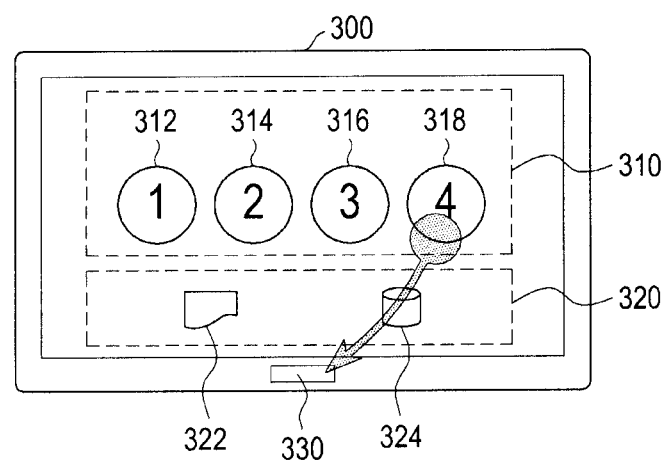
Figure 3D:
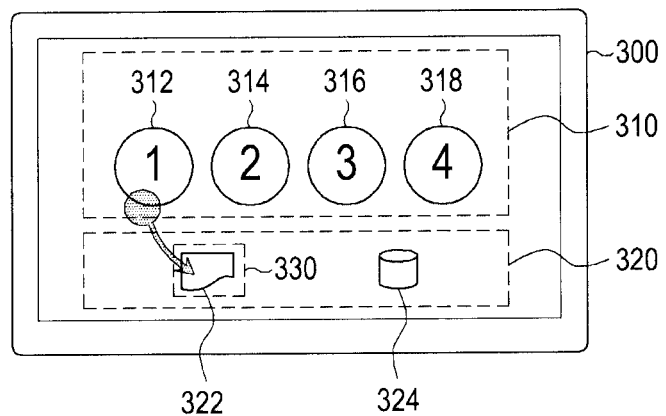
Figure 3E:
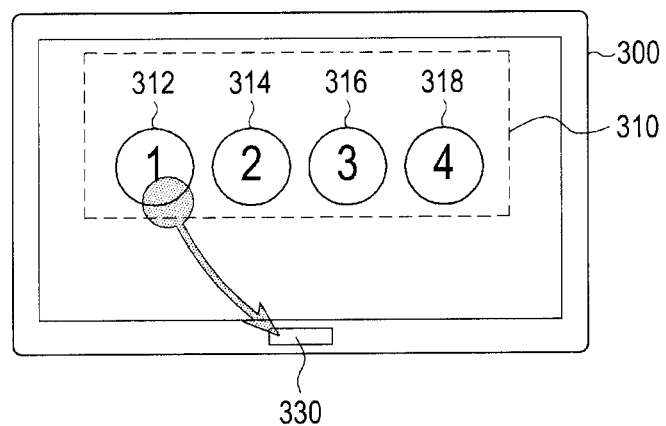

FIGS. 3A through 3F illustrate examples of the function execution method performed in the electronic device according to an embodiment of the present disclosure. FIGS. 3A through 3D illustrate an operation of FIG. 1A and FIG. 3E illustrates an operation of FIG. 1B. In FIGS. 3A through 3F, a process of executing a function associated with a predetermined application has been illustrated.

First, the electronic device (300), as illustrated in FIG. 3A, displays at least one object 312, 314, 316, and 318 on a first area 310. Here, it is assumed that the objects 312, 314, 316, and 318 are icons of applications.

When one object 312 is selected from the at least one object, the electronic device (300), on a second area 320, may display sub-objects 322 and 324 associated with the corresponding object 312, as illustrated in FIG. 3B. Here, it is assumed that the sub-object 322 is a sub-object for creating a folder, and the sub-object 324 is a sub-object for deleting an application.

The electronic device (300), as illustrated in FIG. 3B, may execute recognition of a fingerprint when a user input that passes through the object 312 and the sub-object 322 is sensed in a third area 330. The fingerprint recognition and the user input have been described with reference to FIGS. 2A through 2E and thus, detailed descriptions thereof will be omitted.

The electronic device (300) may execute different functions based on whether a fingerprint of a registered user, which is identical to the recognized fingerprint, exists. For example, when it is determined that the recognized fingerprint is identical to the fingerprint of the registered user, the electronic device (300) may add the corresponding object 312 to an encrypted folder. For example, when it is determined that the recognized fingerprint is different from the fingerprint of the registered user, the electronic device (300) may add a corresponding application to a normal folder that is not encrypted.

As illustrated in FIG. 3C, in an embodiment of the present disclosure, when a user input that passes through the object 318 and the sub-object 324 is sensed and it is determined that the fingerprint recognized in the third area 330 is a fingerprint of the registered user, the electronic device (300) may completely delete the corresponding object 318 from a memory. When it is determined that the fingerprint recognized in the third area 330 is different from the fingerprint of the registered user, the electronic device (300) may not delete the corresponding object 318 from the memory, but may not display the corresponding object 318 on a screen.

Although FIGS. 3A through 3C illustrate a case in which the second area 320 is displayed on a touch screen as illustrated in FIG. 3B when the object 312 is selected in the first area 310 as illustrated in FIG. 3A, the first area 310 and the second area 320 may be simultaneously displayed on the touch screen as illustrated in FIG. 3B. In a state in which the first area 310 and the second area 320 are simultaneously displayed on the touch screen, when a surface pattern included in an input unit used for a user input that passes through the object 312 of the first area 310 and the sub-object 322 or 324 of the second area 320, for example, a fingerprint, is recognized in the third area 330, the electronic device (300) may execute a function identical to a function executed in FIGS. 3A through 3C.

Also, in a state in which the first area 310 and the second area 320 are simultaneously displayed on the touch screen, the electronic device (300) may rearrange objects of the second area 320 based on the object selected in the first area 310.

In FIGS. 3A through 3C, although the second area 320 and the third area 330 are separately displayed, both a function of the second area 320 and a function of the third area 330 may be executed in a single area. As illustrated in FIG. 3D, when a surface pattern function is included in an entire area or a predetermined area of the touch screen, the electronic device (300) may execute, in the second area 320, a surface pattern recognition function which is the function of the third area 330. In a state in which a fingerprint recognition function is included in the second area 320, when the object 322 of the second area 320 is selected successively after the object 312 of the first area 310 is selected by a user input, the electronic device (300) may select the object 322 of the second area 320, and simultaneously, may execute recognition of a surface pattern, for example, a fingerprint, included in an input unit used for the user input.

FIGS. 3A through 3C provide an example that displays, in the second area 320, sub-objects associated with an object that is selected from among the objects displayed in the first area 310, and executes a function associated with a sub-object through which a user input passes through from among the displayed sub-objects. However, depending on embodiments, without displaying a sub-object, a function associated with the object selected by the user from among the objects in the first area may be executed.

For example, as illustrated in FIG. 3E, when one object is selected from among the objects 312, 314, 316, and 318 displayed on the first area 310, and a continuous user input that starts from the selected object 312 is sensed in the third area 330, the electronic device (300) may recognize a surface pattern, for example, a fingerprint, included in an input unit used for the corresponding user input in the third area 330, and may execute a function associated with the corresponding object 312 based on whether the recognized fingerprint is registered.

Figure 3F:
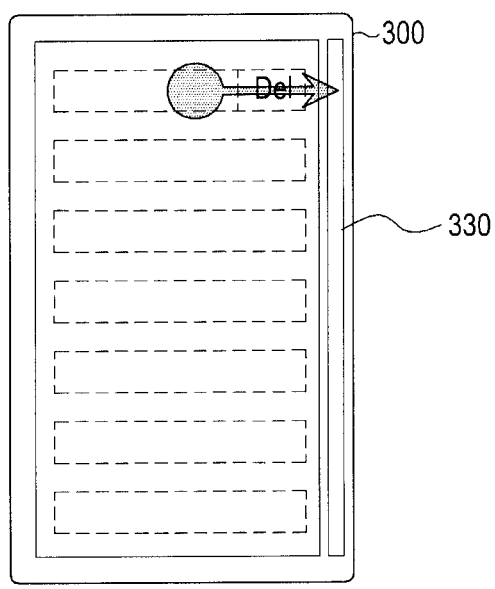

As described above, the second area 320 may be determined based on a location of the selected object and a location of the third area 330. For example, as illustrated in FIG. 3F, when the third area 330 is located in the right side of the electronic device (300), the electronic device (300) may determine the second area 320 to be located between the selected object and the third area 330.

The function execution method performed in the electronic device according to an embodiment of the present disclosure has been described with reference to FIGS. 1 through 3. Hereinafter, a function execution method performed in an electronic device according to another embodiment of the present disclosure will be described with reference to related drawings.

Figure 4:
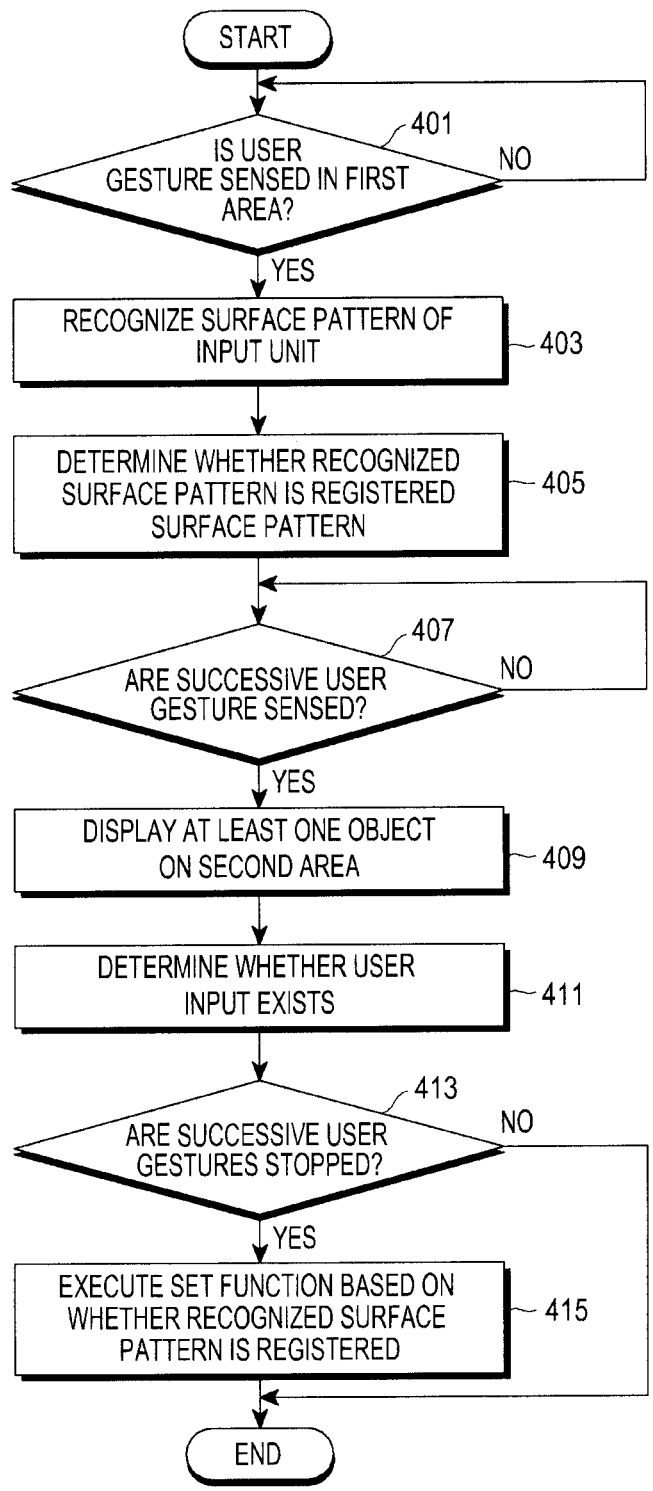
FIG. 4 is a flowchart of a function execution method according to another embodiment of the present disclosure.

FIG. 4 is a flowchart of a function execution method performed in an electronic device according to another embodiment of the present disclosure.

In operation 401, the electronic device determines whether a user input is sensed in a first area. Here, the first area may be an area located in a touch screen or an area located in a frame adjacent to the touch screen. A sensor may be located in the first area. The sensor may be, for example, a fingerprint recognizing sensor. The electronic device may determine that the user input is sensed when an input is sensed in the sensor.

When the user input is sensed in operation 401, the electronic device recognizes a surface pattern of an input unit used for the sensed user input in operation 403. The input unit may correspond to, for example, a finger of a user or a variety of devices such as an electronic pen and the like. When the input unit is the finger of the user, the surface pattern may be, for example, a fingerprint. When the input unit corresponds to a variety of devices such as an electronic pen and the like, the surface pattern may be a pattern traced on a surface that is in contact with the touch screen or a frame.

In operation 405, the electronic device determines whether the recognized surface pattern is a registered surface pattern.

In operation 407, the electronic device determines whether a user input is sensed.

When the user input is sensed in operation 407, the electronic device displays at least one object in the second area, in operation 409. The second area may correspond to a part or the entirety of the display area.

In an embodiment of the present disclosure, the at least one object may be determined based on a function that is capable of being provided to an application that is currently executed. For example, when an application for playing back music is currently executed, objects for guiding a function, such as playback, stop, turning up and down volume, and the like, may be displayed.

In an embodiment of the present disclosure, the electronic device may compare the recognized surface pattern with at least one registered pattern, and may display an object based on whether a registered surface pattern identical to the recognized surface pattern exists. For example, when the recognized surface pattern is identical to the registered surface pattern, objects that are set in advance for the registered user may be displayed. For example, when the recognized surface pattern is different from the registered surface pattern, objects set in advance for a user who is not registered may be displayed.

The at least one object may be an execution screen of a set application or an icon for executing a set function.

In operation 411, the electronic device senses a user input provided on one of the objects displayed on the second area.

In operation 413, the electronic device determines whether the user input is stopped on one of the objects, where the user input is sensed in the second area. The user input may be, for example, a motion that removes a finger or an input unit after a swipe motion.

When it is determined that the user input is stopped in operation 413, the electronic device executes a set function, based on whether a recognized surface pattern is registered. The set function may be a function associated with an object that is displayed on a point where the user input is stopped.

The function execution method performed in the electronic device according to another embodiment of the present disclosure has been described with reference to FIG. 4. Hereinafter, embodiments of the present disclosure will be described in detail with reference to related drawings.

FIGS. 5A through 5F illustrate examples of a function execution method performed in an electronic device according to another embodiment of the present disclosure.

Figure 5A:
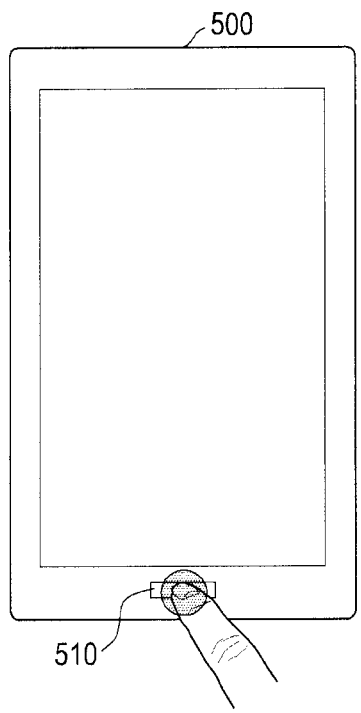

First, as illustrated in FIG. 5A, the electronic device (500) senses whether a user input is input. As described above, a sensor for recognizing a fingerprint may be located in the first area 510. When the user input is sensed in the first area 510, the electronic device (500) may execute fingerprint recognition.

Figure 5B:
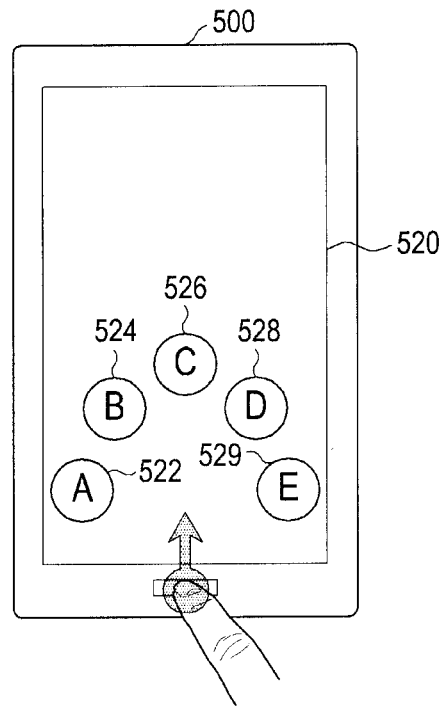
Figure 5C:
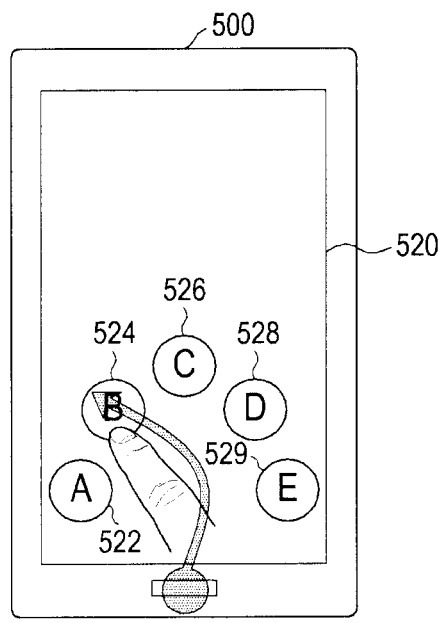

The electronic device (500) may determine whether the recognized fingerprint is a fingerprint of a registered user. When it is determined that the recognized fingerprint is the fingerprint of the registered user, the electronic device (500) may display at least one object (522, 524, 526, 528 and 529) in the second area 520, as illustrated in FIG. 5B. When the user input is sensed on one object 524 from among the objects displayed on the second area 520, and the user input is recognized as a continuous user input that starts from the first area and is continued to the second area and the continuous user input is stopped, the electronic device (500) may execute a function associated with the corresponding object 524. For example, when the object 524 is an icon of an application, the electronic device (500) may execute the corresponding application.

Figure 5D:
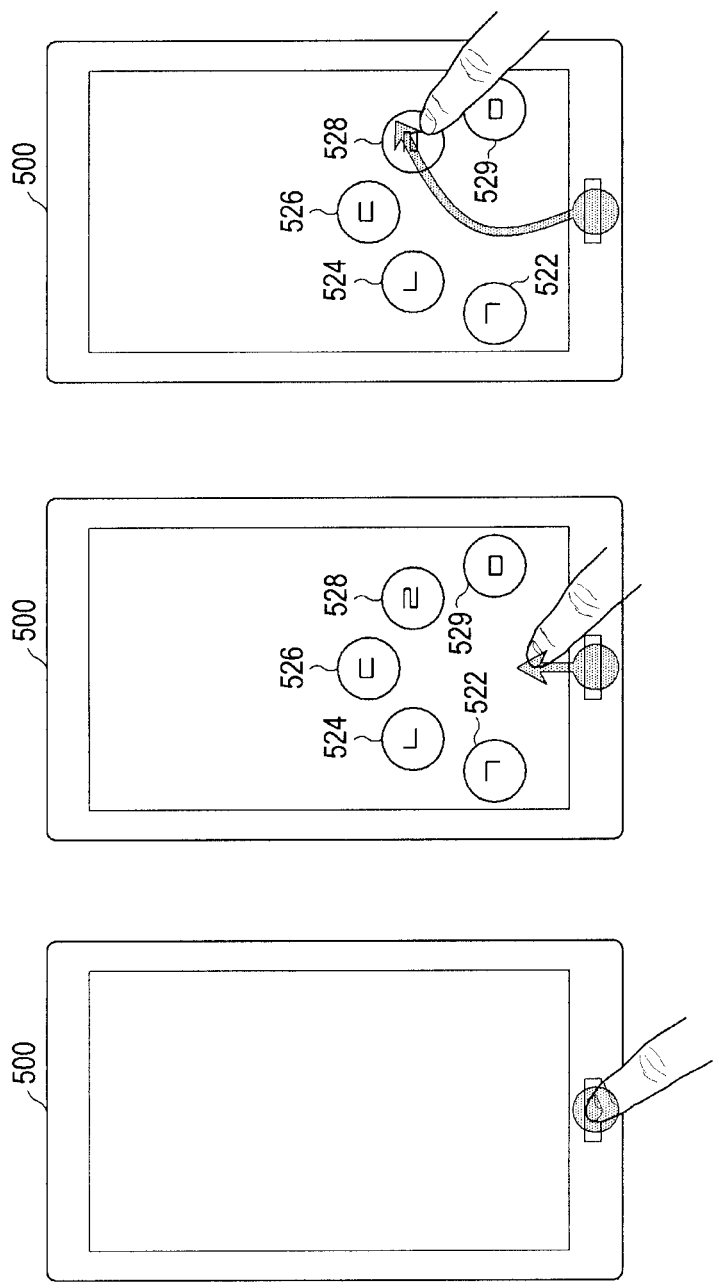

In an embodiment of the present disclosure, when it is determined that the recognized fingerprint is different from the fingerprint of the registered user, the electronic device may display an object that is different from an object that is displayed for the registered user. For example, when it is determined that the recognized fingerprint is a fingerprint of a user who is not registered, the electronic device (500) may display an object for the user who is not registered, as illustrated in FIG. 5D. In this manner, when a continuous user input that is provided up to an object is sensed and is finished on the corresponding object, the electronic device may execute a function associated with the corresponding object.

The object may be an execution screen of a predetermined application. For example, when it is determined that the continuous user input is provided by the registered user, the electronic device may execute a predetermined application for the corresponding user. For example, the electronic device (500) may provide a personalized application screen, as illustrated in FIG. 5E.

For example, when it is determined that the continuous user input is provided by the user who is not registered, the electronic device may execute a normal application based on settings. For example, the electronic device (500) may provide an application screen that is not personalized, as illustrated in FIG. 5F.

FIG. 6 is a block diagram illustrating an electronic device according to various embodiments of the present disclosure. FIG. 6 is a block diagram illustrating an example of a hardware configuration that can be used to implement any of the electronic devices 200, 300, and 500 and/or the electronic devices disucssed with respect to FIGS. 1A, 1B, and 4. As illustrated, the hardware configuration includes a controller 610, a touch screen 620, and a sensor unit 630. The controller 610 may include an x86-based processor, an ARM-based processor, a MIPS-based processor, a Field-Programmable Gate Array (FPGA), an Application-Specific Integrated Circuit (ASIC), and/or any other suitable type of processing circuitry. The touchscreen may include a capacitative-type touchscreen, a resistive-type touchscreen, and/or any other suitable type of touchscreen. The sensor unit 630 may similarly include any suitable type of sensor capable of detecting surface pattern. Although not shown, the hardware configuration may include one or more types of memory (e.g., volatile and non-volatile memory) and/or any other suitable type of component. In an embodiment of the present disclosure, a controller 610 recognizes a surface pattern included in an input unit used for a user input when an object is selected in a first area that displays at least one object and a sub-object is selected in a second area that displays at least one sub-object, and a continuous user input is sensed in a third area after the sub-object is selected, and executes a function associated with the selected sub-object with respect to the selected object when the surface pattern is recognized in the third area.

According to an embodiment of the present disclosure, when an object is selected in the first area, the controller 610 may display at least one sub-object associated with the selected object on the second area. Also, the controller 610 may determine a location of the second area based on a location of the selected object and a location of a third area.

According to an embodiment of the present disclosure, the controller 610 simultaneously displays the first area that includes the at least one object and the second area that includes the at least one sub-object, and rearranges the at least one sub-object in the second area based on the selected object when the object is selected in the first area.

According to an embodiment of the present disclosure, the controller 610 recognizes a surface pattern included in an input unit used for the user input when the continuous user input is sensed in the third area after the object is selected in the first area, and may execute a function associated with the selected object when the surface pattern is recognized in the third area.

According to an embodiment of the present disclosure, the controller 610 recognizes a surface pattern included in an input unit used for the user input in the second area when a sub-object is selected in the second area by a continuous user input after the object is selected in the first area, and may execute a function associated with the selected sub-object with respect to the selected object when the surface pattern is recognized in the second area.

According to an embodiment of the present disclosure, the controller 610 compares the recognized surface pattern with at least one registered surface pattern and determines a function to be executed based on whether a registered surface pattern identical to the recognized surface pattern exists.

According to another embodiment of the present disclosure, the controller 610 determines whether a continuous user input provided from the first area to the second area set on a touch screen 620 is sensed when a user input is sensed in the first area on the sensor unit 630 and a surface pattern is received from the sensor unit 630 and is recognized, and displays at least one object in the second area when the continuous user input is sensed.

According to an embodiment of the present disclosure, the controller 610 may determine the at least one object to be displayed, based on a function that is capable of being provided in an application that is currently executed.

According to an embodiment of the present disclosure, the controller 610 compares the recognized surface pattern with at least one registered surface pattern, and determines at least one object to be display, based on whether a registered surface pattern that is identical to the recognized surface pattern exists.

According to an embodiment of the present disclosure, when the continuous user input provided from the first area to the second area is sensed and the user input is stopped on one of the objects, the controller 610 may execute a function assigned to the corresponding object.

The at least one object may include an execution screen of a set application or an icon for executing a set function.

The touch screen 620 may display a variety of objects based on a control of the controller 610. Also, the touch screen 620 may include a surface pattern recognition function, for example, a fingerprint recognition function.

The sensor unit 630 may recognize a surface pattern of an input unit. The sensor unit 630 may transfer the recognized surface pattern to the controller 610. The sensor unit 630 may include a fingerprint recognition sensor. The sensor unit 630 may be located in the touch screen 620, or may be located in a place (for example, a frame) adjacent to the touch screen 620.

It should be noted that the FIGS. 1A, 1B, and 4 are provided as examples only. At least some of the operations depicted in these figures may be performed concurrently, performed in a different order, or altogether omitted.

It is to be understood that any of the operations discussed with respect to these figures may be performed by an electronic device (e.g., the electronic device 200, 300, or 500) or a controller thereof (e.g., the controller 610). As used throughout the disclosure, the term "object" refers to any screen (e.g., application screen, website screen, etc.), graphical user interface component (e.g., an icon, a button, etc.), and/or another item that is displayable on a display screen of an electronic device. As used throughout the disclosure, the term "sub-object" refers to any screen (e.g., application screen, website screen, etc.), graphical user interface component (e.g., an icon, a button, etc.), and/or another item that is displayable on a display screen of an electronic device. As used throughout the disclosure, the term "input instrument" refers to any physical object that is detectable by a touchscreen or another input device.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

As these and other variations and combinations of the features discussed above can be utilized without departing from the subject matter as defined by the claims, the foregoing description of exemplary aspects should be taken by way of illustration rather than by way of limitation of the subject matter as defined by the claims. It will be understood that that the provision of the examples described herein (as well as clauses phrased as "such as," "e.g.", "including", "in some implementations", "in some aspects", and the like) should not be interpreted as limiting the claimed subject matter to the specific examples; rather, the examples are intended to illustrate only some of many possible aspects. It will be further understood, that the examples provided throughout the disclosure are not mutually exclusive; any concept described with respect to one of the examples could be applied to any one of the remaining examples in the present disclosure.

What is claimed is:

1. A method of executing a function in an electronic device, the method comprising:
   if an object in a first area of a touch screen of the electronic device is selected, displaying at least one sub-object associated with the selected object in a second area of the touch screen;
   sensing a user input for selecting an sub-object in the second area;
   recognizing a surface pattern of an input unit used for providing a user input on a third area of the touch screen if the user input is sensed on the third area; and
   executing a related function, based on a surface pattern recognition result in the third area, if the user input on the first area, the user input on the second area, and the user input on the third area are associated with each other.

2. The method of claim 1, wherein executing the related function comprises:
   comparing the recognized surface pattern with a registered surface pattern; and if a registered surface pattern identical to the recognized surface pattern exists, executing a function associated with the object selected in the first area.

3. The method of claim 1, wherein the user input on the first area and the user input on the third area comprise:
a continuous input motion in which the user input on the first area is continued to the third area, or a sequential input motion in which a user input is sequentially provided in each of the first area and the third area within a predetermined period of time.

4. The method of claim 1, wherein the user input on the first area, the user input on the second area, and the user input on the third area comprise:
a continuous input motion in which the user input on the first area is continued to the second area, and to the third area, or a sequential input motion in which a user input is sequentially provided in each of the first area, the second area, and the third area within a predetermined period of time.

5. The method of claim 1, wherein displaying the at least one sub-object comprises:
determining a location of the second area, based on a location of the object selected in the first area and the location of the third area.

6. The method of claim 1, further comprising:
simultaneously displaying the first area including at least one object and the second area including the at least one sub-object; and
rearranging the location of the at least one sub-object in the second area, based on the selected object if the object is selected in the first area.

7. The method of claim 1, further comprising:
recognizing a surface pattern of an input unit used for providing the user input on the second area if the sub-object is selected in the second area; and
executing a function associated with the object selected in the first area and the sub-object selected in the second area if a registered surface pattern identical to the surface pattern recognized in the second area exists.

8. The method of claim 1, wherein the surface pattern comprises a fingerprint.

9. A method of executing a function in an electronic device, the method comprising:
if a user input is sensed in a first area of a touch screen of the electronic device, recognizing a surface pattern of an input unit used for providing the user input on the first area of the touch screen;
if a user input is sensed in a second area of the ouch screen, displaying at least one object on the second area of the touch screen;
executing a related function associated with the user input on the first area and the user input on the second area of the touch screen, based on a surface pattern recognition result in the first area if an object of at least one object displayed in the second area is selected.

10. An electronic d e comprising:
a touch screen;
a sensor unit configured to recognize a surface pattern of an input unit; and
a controller configured to:
display at least one sub-object associated with a selected object in a second area of the touch screen if an object in a first area of the touch screen is selected,
sense a user input for selecting an sub-object in the second area, recognize a surface pattern of an input unit used for providing a user input on a third area of the touch screen if the user input is sensed on the third area, and
execute a related function, based on a surface pattern recognition result in the third area, if the user input on the first area, the user input on the second area, and the user input on the third area are associated with each other.

11. The electronic device of claim 10, wherein the surface pattern comprises a fingerprint.

12. The electronic device of claim 10, wherein the controller compares the recognized surface pattern with a registered surface pattern, and if a registered surface pattern identical to the recognized surface pattern exists, executes a function associated with the object selected in the first area.

13. The electronic device of claim 10, wherein the user input on the first area and the user input on the third area comprise:
a continuous input motion in which the user input on the first area is continued to the third area, or a sequential input motion in which a user input is sequentially provided in each of the first area and the third area within a predetermined period of time.

14. The electronic device of claim 10, wherein the user input on the first area, the user input on the second area, and the user input on the third area comprise:
a continuous input motion in which the user input on the first area is continued to the second area, and to the third area, or a sequential input motion in which a user input is sequentially provided in each of the first area, the second area, and the third area within a predetermined period of time.

15. The electronic device of claim 10, wherein the controller determines a location of the second area based on a location of the object selected in the first area and a location of the third area.

16. The electronic device of claim 10, wherein the controller simultaneously displays the first area including at least one object and the second area including the at least one sub-object, and rearranges the location of the at least one sub-object in the second area based on the selected object if the object is selected in the first area.

17. The electronic device of claim 10, wherein the controller comprises:
recognizing a surface pattern of an input unit used for providing the user input on the second area if the sub-object is selected in the second area; and
executing a related function associated with the object selected in the first area and the sub-object selected in the second area if a registered surface pattern identical to the surface pattern recognized in the second area exists.

18. An electronic device, comprises:
touch screen;
a sensor unit; and
a controller configured to:
recognize a surface pattern of an input unit used for providing a user input on a first area if the user input is sensed in the first area of the touch screen,
display at least one object on a second area of the touch c en if a user input is sensed in a second area of the touch screen, and
execute a related function associated with the user input on the first area and the user input on the second area of the touch screen, based on a surface pattern recognition result in the first area, if an object of at least one object displayed in the second area is selected.

* * * * *